United States Patent
Thome et al.

(10) Patent No.: US 9,346,418 B2
(45) Date of Patent: May 24, 2016

(54) SEALING STRAND FOR ADHERING TO A VEHICLE BODY

(71) Applicant: CQLT SaarGummi Technologies S.à.r.l., Remich (LU)

(72) Inventors: Martin Thome, Schmelz-Limbach (DE); Thomas Erschens, Weiskirchen (DE); Christian Kast, Merzig-Brotdorf (DE)

(73) Assignee: CQLT SaarGummi Technologies S.à.r.l., Remich (LU)

( * ) Notice: Subject to any disclaimer, the term of this patent is extended or adjusted under 35 U.S.C. 154(b) by 0 days.

(21) Appl. No.: 14/413,564

(22) PCT Filed: Jul. 16, 2013

(86) PCT No.: PCT/EP2013/002105
§ 371 (c)(1),
(2) Date: Jan. 8, 2015

(87) PCT Pub. No.: WO2014/012656
PCT Pub. Date: Jan. 23, 2014

(65) Prior Publication Data
US 2015/0175092 A1  Jun. 25, 2015

(30) Foreign Application Priority Data
Jul. 17, 2012 (DE) ...................... 20 2012 102 647 U

(51) Int. Cl.
*E06B 7/22* (2006.01)
*B60R 13/06* (2006.01)
*F16J 15/10* (2006.01)

(52) U.S. Cl.
CPC ............... *B60R 13/06* (2013.01); *B60J 10/246* (2016.02); *B60J 10/35* (2016.02); *B60J 10/84* (2016.02); *F16J 15/104* (2013.01)

(58) Field of Classification Search
CPC .......................... B60J 10/0077; B60J 10/0011
See application file for complete search history.

(56) References Cited

U.S. PATENT DOCUMENTS

| | | | | |
|---|---|---|---|---|
| 5,771,652 A | * | 6/1998 | Nagata et al. | ........... 52/716.5 |
| 5,950,366 A | * | 9/1999 | Uhlmeyer | ........... 49/484.1 |
| 6,405,489 B1 | | 6/2002 | Miura | |
| 2007/0180776 A1 | | 8/2007 | Oba et al. | |

(Continued)

FOREIGN PATENT DOCUMENTS

| | | |
|---|---|---|
| DE | 100 43 136 A1 | 4/2002 |
| DE | 10 2005 013 005 A1 | 9/2006 |
| DE | 10 2006 027 697 A1 | 12/2007 |
| DE | 10 2011 106 337 A1 | 1/2013 |

OTHER PUBLICATIONS

International Search Report of PCT/EP2013/002105, mailed Aug. 21, 2013.

(Continued)

*Primary Examiner* — Gilbert Lee
(74) *Attorney, Agent, or Firm* — Collard & Roe, P.C.

(57) ABSTRACT

A sealing strand for producing a seal on a vehicle body by adhering the sealing strand to the vehicle body, in particular by adhering to a body flange, has a fixing portion with an adhesive surface, which is provided for adhering to the vehicle body, and a seal portion, which is connected to the fixing portion on the fixing portion side facing away from the adhesive surface, thereby forming a tube, the tube bending inwards on at least one side under the influence of a pressing force acting perpendicularly to the adhesive surface.

8 Claims, 2 Drawing Sheets

(56) References Cited

U.S. PATENT DOCUMENTS

Figure 4:
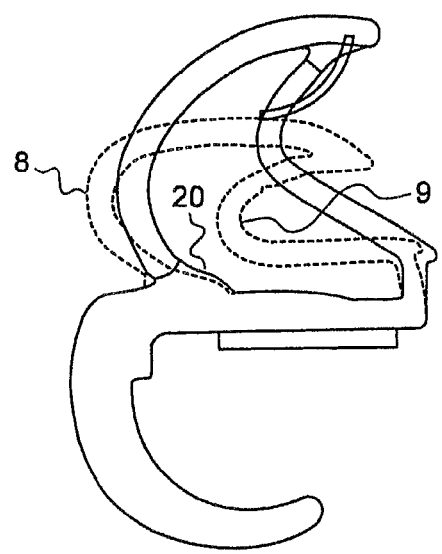

2007/0245634 A1\* 10/2007 Oba et al. ...................... 49/498.1
2010/0086732 A1\* 4/2010 Tamura ......................... 428/131
2012/0324797 A1 12/2012 Chiatti

OTHER PUBLICATIONS

German Search Report in 20 2012 102 647.3, dated May 24, 2013, with English translation of relevant parts.

\* cited by examiner

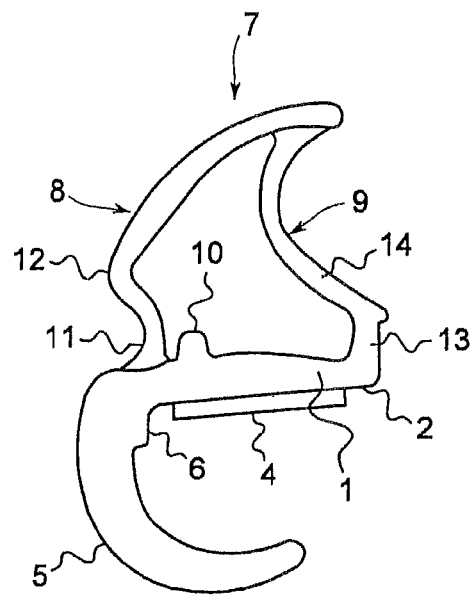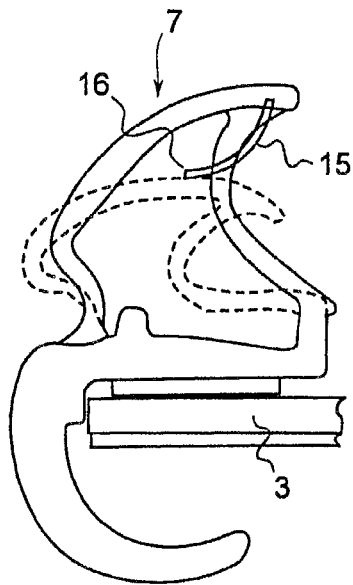
Fig. 1              Fig. 2
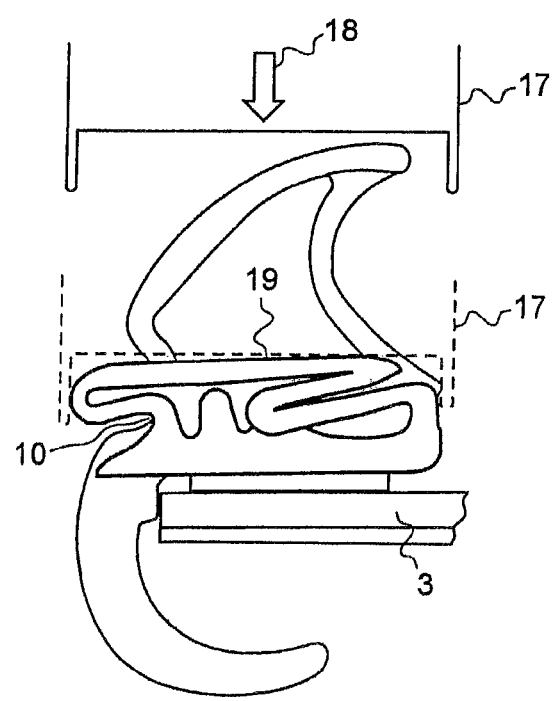
Fig. 3

SEALING STRAND FOR ADHERING TO A VEHICLE BODY

CROSS REFERENCE TO RELATED APPLICATIONS

This application is the National Stage of PCT/EP2013/002105 filed on Jul. 16, 2013, which claims priority under 35 U.S.C. §119 of German Application No. 20 2012 102 647.3 filed on Jul. 17, 2012, the disclosure of which is incorporated by reference. The international application under PCT article 21(2) was not published in English.

The invention relates to a sealing strand for the production of a seal on a vehicle body, with adhesive attachment of the sealing strand to the vehicle body, particularly with adhesive attachment to a body flange, wherein the sealing strand has an attachment section having an adhesive surface provided for adhesive attachment to the vehicle body, and a sealing section, which section is connected with the attachment section on its side facing away from the adhesive surface, forming a tube.

Such a sealing strand is known from DE 10 2006 027 697 A1, which has a bead having a level contact surface of the attachment section on its side facing away from the adhesive surface, which bead serves for transferring the press-down pressure of a pressing tool to the adhesive surface.

The invention is based on the task of creating a new sealing strand of the type mentioned initially, which allows more secure adhesive attachment to the vehicle body than according to the state of the art, with an improved sealing effect.

The sealing strand according to the invention that accomplishes this task is characterized in that the tube is indented inward on at least one side, under the influence of a press-down force perpendicular to the adhesive surface.

It is advantageous that the tube that is indented inward can form a bead that allows targeted, reliable transfer of the press-down force during adhesive attachment of the tube.

Preferably, a tube wall section that is pre-bent inward is formed on at least one side of the tube. It is advantageous if this tube wall section can move away only inward when compressed.

The stated tube wall section preferably consists of the same material as the attachment section, and particularly makes a transition into the attachment section, in one piece. By means of the harder material of the attachment section, the tube wall section can transfer a greater press-down force, effective for the sealing effect, in the installed state of the seal. During adhesive attachment, it forms a firm bead that is suitable for transfer of high press-down forces to the adhesive surface.

Preferably, the tube wall section that is indented inward is disposed in such a manner that it forms a bead that transfers the press-down force to the center of the adhesive surface.

In the preferred embodiment of the invention, a tube wall section that bulges outward under the influence of the press-down force lies opposite the tube wall section that is indented inward, whereby this section is formed from foam rubber and forms the sealing part of the sealing section.

The tube wall section that bulges outward and/or the tube wall section that is indented inward can each have a foot section that extends perpendicular to the adhesive surface.

Preferably, the attachment section has a crosspiece on its side facing away from the adhesive surface, which section is provided for placement between a foot part of the tube wall section that bulges outward and the bead, which can be formed by the tube wall section that is indented inward.

Preferably, a double-sided adhesive tape is used for adhesive attachment of the sealing strand to the vehicle body.

Figure 5:
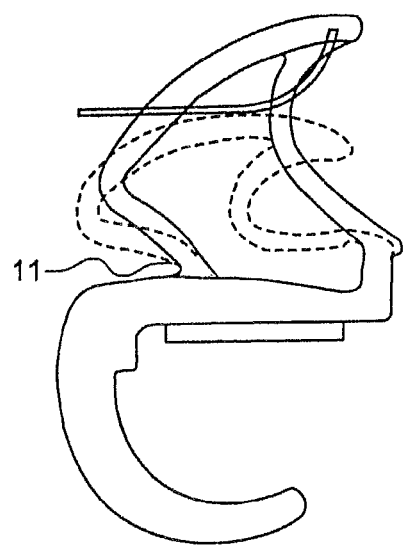

The invention will be explained in greater detail in the following, using exemplary embodiments and the attached drawings that relate to these exemplary embodiments. These show:

FIG. 1 a first exemplary embodiment of a sealing strand according to the invention FIG. 2 the sealing strand of FIG. 1 in the installed state, FIG. 3 a representation that explains the installation of the sealing strand of FIG. 1 by means of adhesive attachment, FIGS. 4 and 5 further exemplary embodiments of sealing strands according to the invention.

A sealing strand shown in FIG. 1 comprises an attachment section 1 having an adhesive surface 2 for adhesive attachment of the sealing strand to a body flange 3 shown in FIG. 3 (FIG. 2, 3), on a vehicle body that is not shown, for the remainder. A double-sided adhesive tape 4 serves for adhesive attachment.

A cover lip 5, which covers a gap formed on the vehicle body in the adhesively attached state of the sealing strand, and has a stop 6 for the free end of the body flange 3, close to the connection location to the attachment section 1, is connected with the attachment section 1, in one piece.

On its side facing away from the adhesive surface 2, the attachment section 1 is connected with a sealing section 7, forming a tube, which section comprises a tube wall section 8 composed of foam rubber. The tube wall section 8 is co-extruded with the remainder of the strand. A tube wall section 9 makes a transition, in one piece, into the attachment section 1, and consists of a harder elastomer material as compared with the foam rubber. Close to the connection location of the attachment section 1 to the tube wall section 8, a crosspiece 10 projects from the attachment section.

As FIG. 1 shows, the tube wall section 8 makes a transition from a foot part 11 that is approximately perpendicular to the adhesive surface 2 into a partial section 12 that is bent outward. The tube wall section 9 also has a foot part, indicated with 13, that is approximately perpendicular to the adhesive surface 2, followed by a partial section 14 that is bent inward.

FIG. 2 shows the sealing strand of FIG. 1 in the installed state, in which it is adhesively attached to a body flange 3 that runs around the circumference of a vehicle door opening, by way of the double-sided adhesive tape 4, and lies against a section 15 of a vehicle door, not shown for the remainder, with its sealing section 7, causing deformation of the tube wall sections 8, 9, forming a seal. The comparatively rigid tube wall section 9 ensures a relatively great press-down force at the sealing location at 16, and thereby a corresponding sealing effect.

During its adhesive attachment, the sealing strand is pressed against the body flange 3 in the direction of the arrow 18, perpendicular to the adhesive surface 2, using a roller application device 17 shown schematically in FIG. 3, whereby the tube wall section 8 buckles outward, with indentation, and the tube wall section 9 buckles inward, with indentation. The tube wall section 9 forms a bead 19 that guides the press-down force generated by the roller application device 17 approximately to the center of the adhesive surface 2, and ensures effective adhesive attachment of the sealing strand to the body flange 3. In the edge region of the adhesive surface 2, the support crosspiece 10 disposed between the foot part 11 and the bead 19 ensures additional transfer of press-down force.

FIG. 4 shows a sealing strand that differs from the sealing strand described above in that the support crosspiece 10 is absent, but the tube wall section 9 forms a bead when compressed according to FIG. 3, which bead reaches all the way to a lateral widened region 20 of the foot part 11 of the tube wall section 8. During compression, uniform transfer of the press-down force to the adhesive surface is thereby achieved.

In the exemplary embodiment of FIG. 5, a support crosspiece corresponding to the support crosspiece 10 is also absent. Instead, the foot part 11 is moved farther toward the center of the attachment section 1, and set at a slight outward slant.

The invention claimed is:

1. Sealing strand for the production of a seal on a vehicle body, with adhesive attachment of the sealing strand to the vehicle body, particularly with adhesive attachment to a body flange, wherein the sealing strand has an attachment section having an adhesive surface provided for adhesive attachment to the vehicle body, wherein the sealing strand has a sealing section connected with the attachment section on its side facing away from the adhesive surface, the sealing section forming a tube, and wherein under the influence of a press-down force perpendicular to the adhesive surface, the tube is indented inward in a direction parallel to the adhesive surface on at least one side and collapsed such that a bead is formed that transfers the press-down force to the adhesive surface.

2. Sealing strand according to claim 1, wherein a tube wall section that is pre-bent inward is formed on at least one side of the tube.

3. Sealing strand according to claim 2, wherein the tube wall section is formed from the same material as the attachment section and particularly makes a transition into the attachment section, in one piece.

4. Sealing strand according to claim 2, wherein the tube wall section that is pre-bent inward forms a bead that transfers the press-down force uniformly to the center of the adhesive surface.

5. Sealing strand according to claim 2, wherein a tube wall section that bulges outward under the influence of the press-down force lies opposite the tube wall section that is pre-bent inward.

6. Sealing strand according to claim 5, wherein the tube wall section that is pre-bent inward and/or the tube wall section that bulges outward have/has a foot part that extends perpendicular to the adhesive surface.

7. Sealing strand according to claim 5, wherein the attachment section has a support crosspiece on its side facing away from the adhesive surface, which crosspiece is disposed for placement between a foot part of the tube wall section that bulges outward and the bead, which part is formed by the pre-bent tube wall section that is indented inward.

8. Sealing strand according to claim 1, wherein a double-sided adhesive tape is provided for adhesive attachment of the sealing strand to the vehicle body.

* * * * *